(No Model.) 6 Sheets—Sheet 1.

J. CUNNING & G. A. LOWRY.
HOG SCRAPING MACHINE.

No. 377,353. Patented Jan. 31, 1888.

WITNESSES. INVENTORS.
James B. Lézieus. James Cunning,
R. P. Daggett. and George A. Lowry,
PER
C. Bradford,
ATTORNEY.

(No Model.) 6 Sheets—Sheet 2.

J. CUNNING & G. A. LOWRY.
HOG SCRAPING MACHINE.

No. 377,353. Patented Jan. 31, 1888.

WITNESSES.
James B. Liziers.
R. P. Daggett

INVENTORS.
James Cunning,
and George A. Lowry,
PER
C. Bradford
ATTORNEY.

(No Model.) 6 Sheets—Sheet 4.

J. CUNNING & G. A. LOWRY.
HOG SCRAPING MACHINE.

No. 377,353. Patented Jan. 31, 1888.

WITNESSES.
James B. Lejeus.
R. P. Daggett.

INVENTORS.
James Cunning,
George A. Lowry,
PER C. Bradford,
ATTORNEY.

(No Model.) 6 Sheets—Sheet 5.

J. CUNNING & G. A. LOWRY.
HOG SCRAPING MACHINE.

No. 377,353. Patented Jan. 31, 1888.

WITNESSES.
James B. Lizius.
R. P. Daggett.

INVENTORS.
James Cunning
and George A. Lowry,
PER
C. Bradford,
ATTORNEY.

(No Model.) 6 Sheets—Sheet 6.
J. CUNNING & G. A. LOWRY.
HOG SCRAPING MACHINE.
No. 377,353. Patented Jan. 31, 1888.
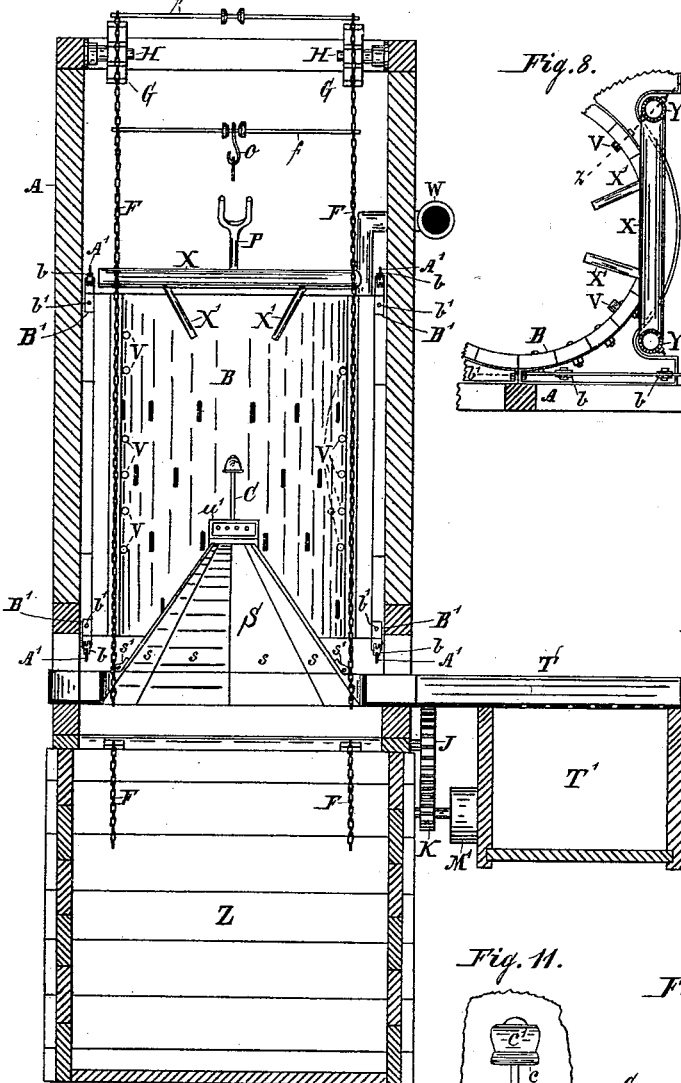
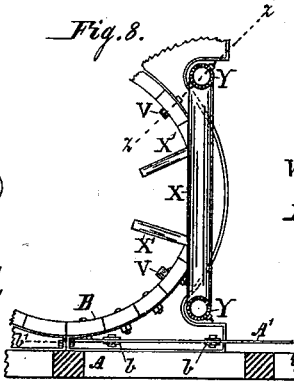
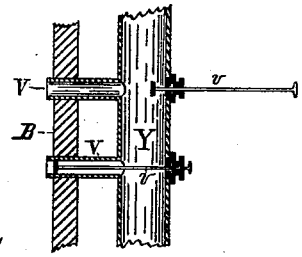
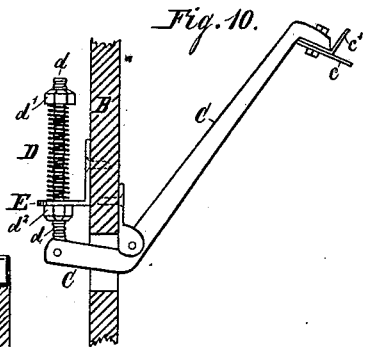
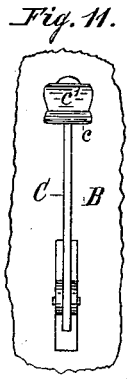
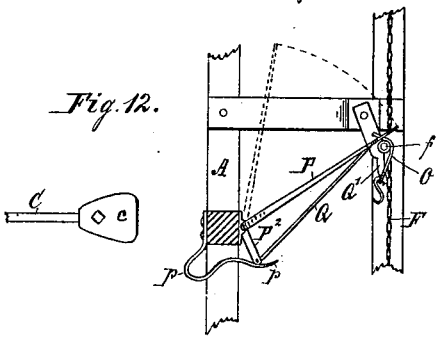
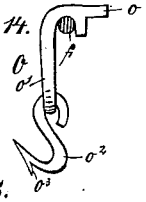
WITNESSES.
James B. Lizius.
R. P. Daggett
INVENTORS:
James Cunning,
and George A. Lowry,
PER
C. Bradford
ATTORNEY.
N. PETERS, Photo-Lithographer, Washington, D. C.

UNITED STATES PATENT OFFICE.

JAMES CUNNING AND GEORGE A. LOWRY, OF INDIANAPOLIS, INDIANA;
SAID LOWRY ASSIGNOR TO FRANK P. WOOLLEN, OF SAME PLACE.

HOG-SCRAPING MACHINE.

SPECIFICATION forming part of Letters Patent No. 377,353, dated January 31, 1888.

Application filed April 1, 1880. Serial No. 6,433. (No model.)

*To all whom it may concern:*

Be it known that we, JAMES CUNNING and GEORGE A. LOWRY, of the city of Indianapolis, county of Marion, and State of Indiana, have invented certain new and useful Improvements in Hog-Scraping Machines, of which the following is a specification.

The object of our said invention is to rapidly and effectively scrape from the carcasses of hogs or other animals the hair, dirt, and bristles, and also to wash and clean such carcasses thoroughly. This object is accomplished by a machine constructed for the purpose, and by various appliances connected therewith, as will hereinafter be more fully set forth.

Figure 1:
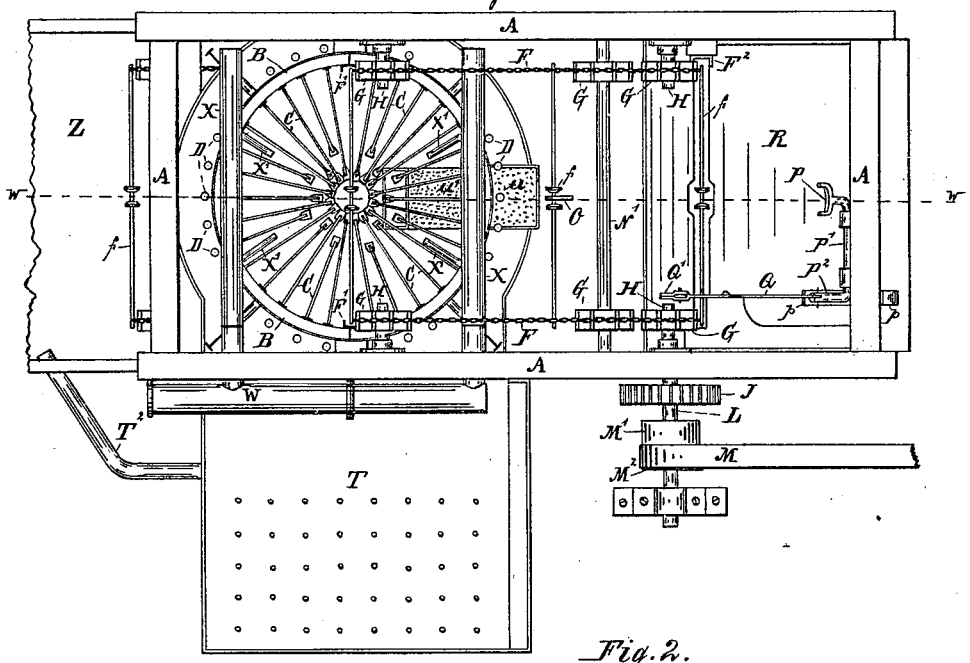
Figure 2:
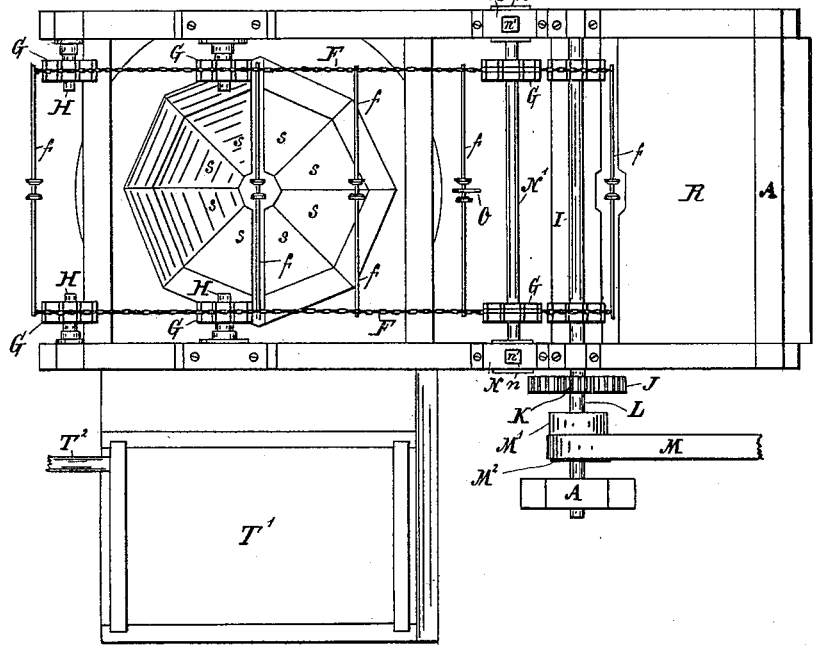
Figure 3:
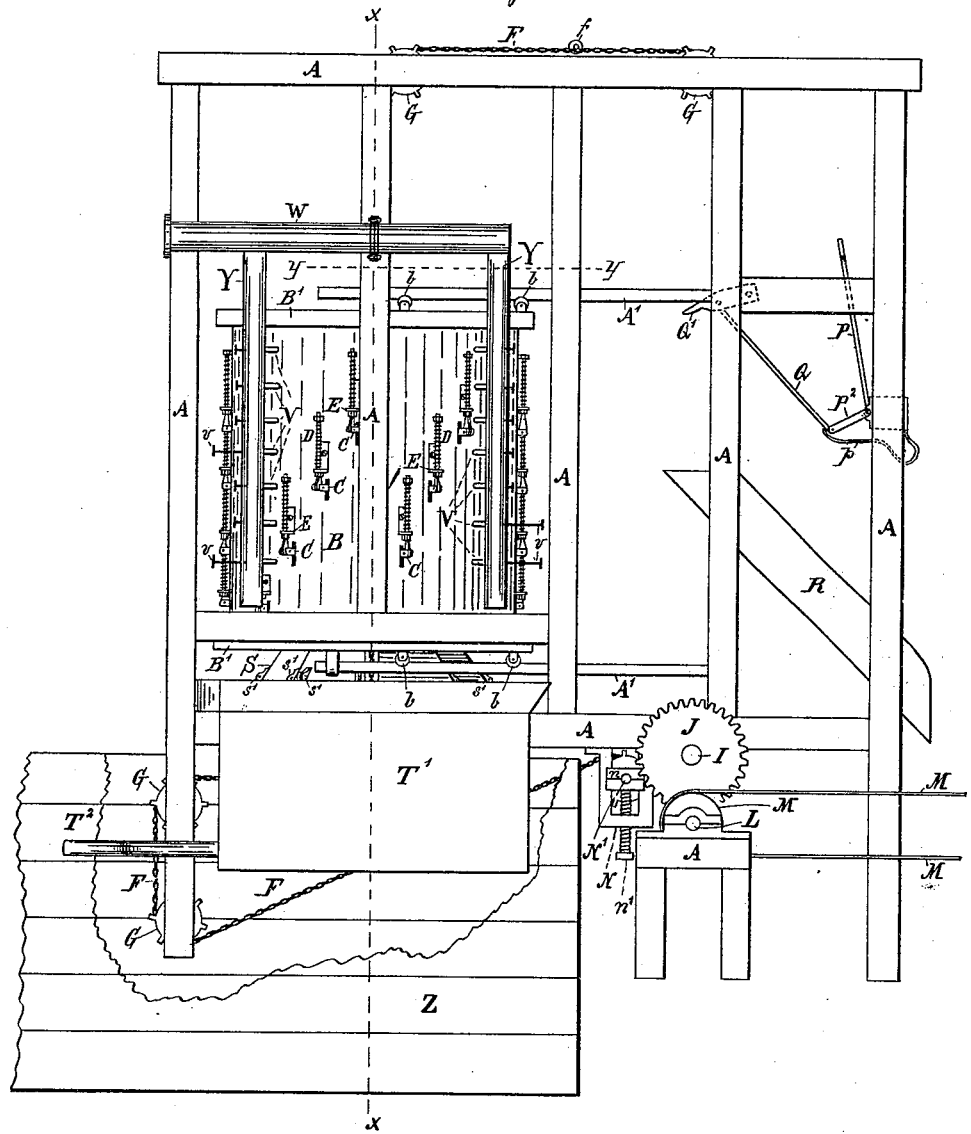
Figure 4:
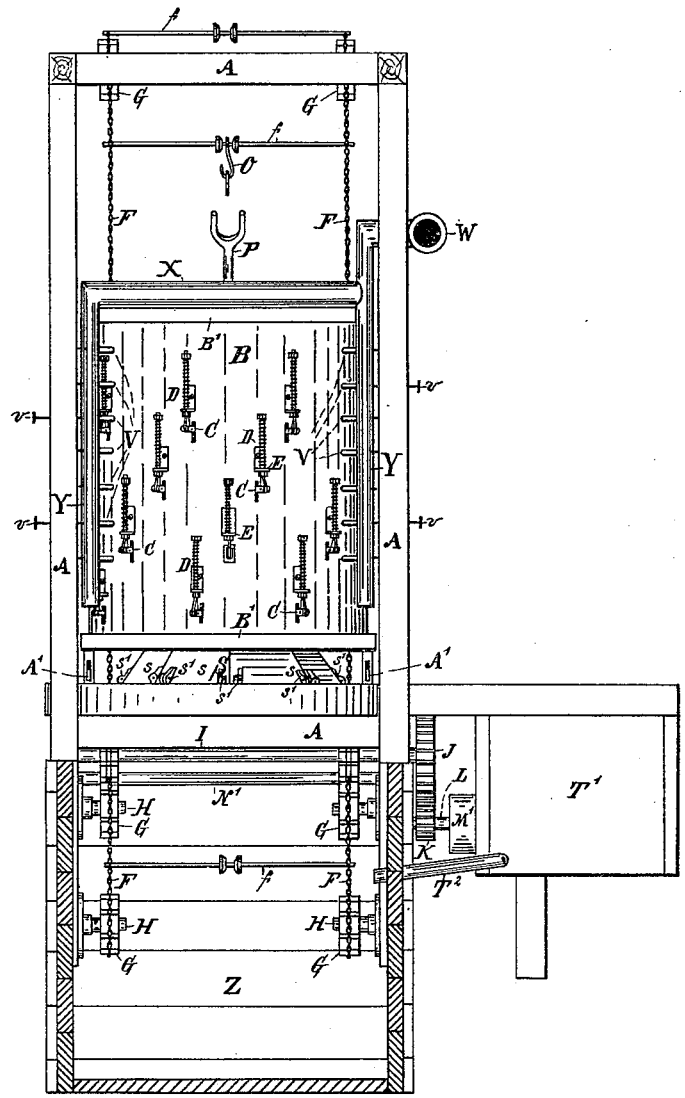
Figure 5:
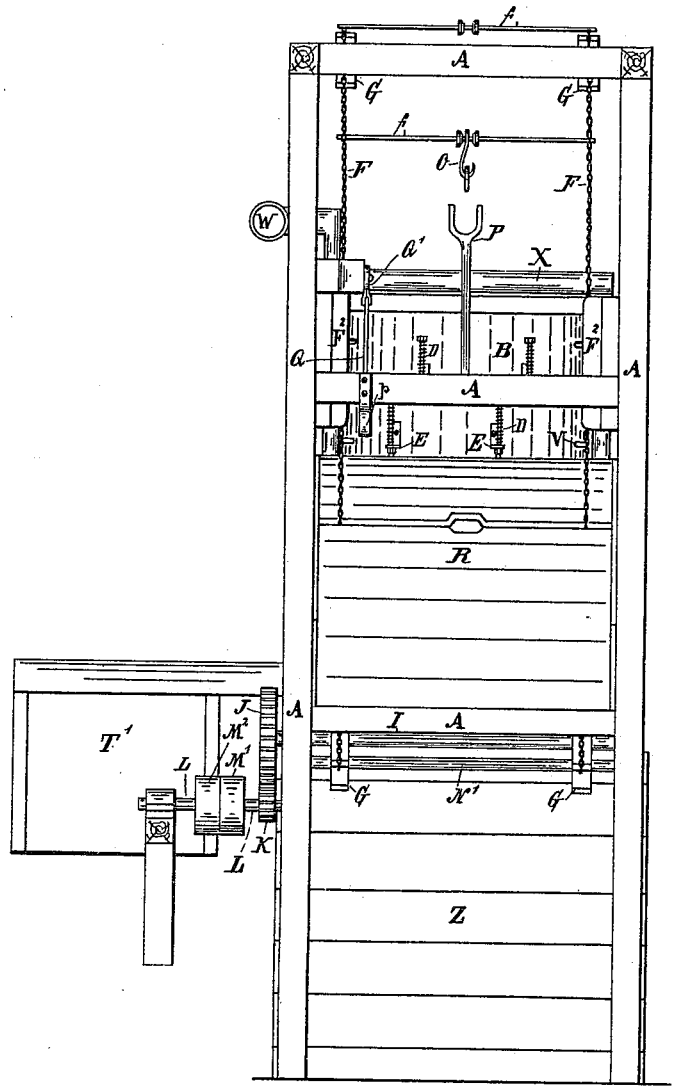
Figure 6:
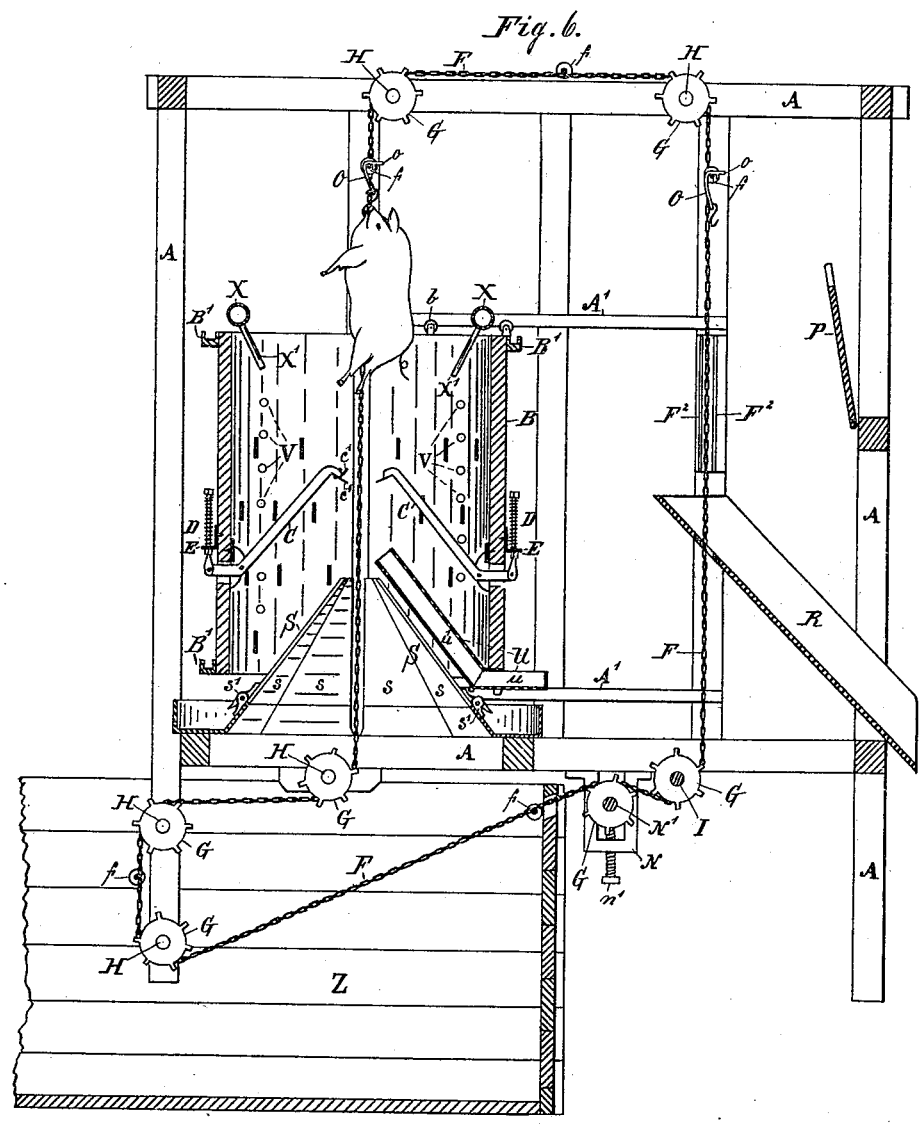

Referring to the accompanying drawings, which are made a part hereof, Figure 1 is a top or plan view of a machine embodying our invention, the top casting, B', and track being omitted to show the spring attachments; Fig. 2, an under side plan showing the arrangement of the lower mechanism and appliances; Fig. 3, a side elevation; Fig. 4, a front end elevation; Fig. 5, a rear end elevation; Fig. 6, a longitudinal vertical section looking toward the upper side from the dotted line $ww$ in Fig. 1; Fig. 7, a transverse vertical section looking to the right from the dotted line $xx$ in Fig. 3; Fig. 8, a detail of a portion of the top of the cylinder, looking downwardly from the dotted line $yy$ in Fig. 3; Fig. 9, a detail section, on an enlarged scale, on the dotted line $zz$ in Fig. 8; Fig. 10, a detail, on the same scale, showing the construction of the scrapers more clearly; Fig. 11, a front elevation of Fig. 10; Fig. 12, an under side plan of one of the scraping-knives $c$; Fig. 13, a separate view of the tripping mechanism, and Fig. 14 a separate view of the hook by which the carcass is attached to the machine. Of these views Figs. 9, 10, 11, 12, and 14 are on a larger scale than the others.

In said drawings, the portions marked A represent posts and beams constituting a frame-work for supporting the various parts of which our invention is composed.

B is a cylinder, which contains and supports the scrapers used in this invention.

C C are adjustable scrapers, which are arranged within the cylinder B in the form of converging rows, and which come in contact with the skin of the hog's carcass as it is pulled through the cylinder and scrape therefrom the hair, bristles, and dirt, thus performing by machinery the same work that is ordinarily done by hand.

D are spring attachments to the scrapers, by which they are rendered adjustable.

E E are bracket-shaped pieces upon the outside of the cylinders, to which the spring attachments are connected by means of the rod $d$.

F is an endless chain ladder traveling up through the cylinder B, and carrying with it the carcasses which are attached to the bars $f$ of said ladder by hooks or other appropriate means.

G G are sprocket-wheels, over which the chains of said ladder run, and which are for the most part set on stud-shafts H, thus leaving a clear space for the passage of the carcass through the greater portion of the length of said chains.

I is a driving-shaft passing through the machine at a point not reached by the carcass, and bearing two of the sprocket-wheels G, by which the chains are driven.

J is a spur-gear upon the shaft I, and K a smaller gear upon a counter-shaft, L.

M' M² are tight and loose belt-pulleys upon the shaft L, over which the driving-belt M runs.

N N are saddles, provided with adjustable bearings $n$, in which runs a shaft, N', carrying wheels, by means of which the tension of the chain ladder is adjusted.

O are peculiarly-formed hooks, by which the carcass is attached to the bars $f$.

P is a trip-rod, which is mounted on a horizontal shaft, P', having an arm, P², on the other end, connected, through the rod Q, with with the lever Q', with which the bars $f$ come in contact as the chain ladder travels. By this means said trip-rod is operated to throw the hooks and the carcasses attached thereto from the bars when they fall upon the chute R and pass away from the machine by their own momentum. The trip-rod P is kept in place when not in use by the spring $p$, or other appropriate spring or weight attachments.

S is a hair-catcher, composed of several hinged parts, $s\ s$, which open outwardly to let the carcass pass through, and fall together by their own weight as soon as it has passed, and which catch all the hair and dirt and convey it outside the machine upon the perforated platform T, whence it is thrown off. The water, after passing through the perforations into the tank T', flows back to the scalding-tub through the pipe T². The perforated platform also operates to condense the foam raised by the passage of the water through the machine.

U is a bristle-catcher attached to the cylinder B, by which the bristles suitable for brushes and the like are saved separately from the other hair.

V W X Y represent a system of water-pipes, and Z the scalding-trough.

In operation the carcass is attached to a bar, f, of the endless ladder, in the manner shown, or by other suitable means, at the point where said ladder comes to the front of the machine, and is pulled up through the cylinder and subjected to the action of the scrapers therein, when it is ejected from the machine, as herein described. If a sufficient number of scrapers are employed, (we have used ninety with success,) this one passage through a single cylinder will be sufficient, though we may use two cylinders, (the second one to stand where the chute R is shown in the drawings,) the carcass to be passed down through said second cylinder, in the opposite direction from that in which it passed through the first, thus subjecting it to two complete scrapings—one in each direction—and thereby insuring that no portion be left unscraped. As before stated, however, it is thought that one passage through a single cylinder will ordinarily be sufficient, and such practical use as has been made of the machine seems to bear out this conclusion.

In this machine, as the hog is pulled through the cylinder the scrapers of course are forced back, and as the arms are necessarily converging the scrapers must recede from one another as well as from the center of the cylinder. In order that this shall not operate to break the circle of scraping-edges, the scrapers are inserted so that their inner or scraping ends shall be at varying distances from the center of the cylinder, so that as those nearest the center are forced out they are re-enforced by others, and as the expanding process goes on all these by still others, so that there shall at all times be a complete circle of scraping-edges surrounding the carcass, no matter what its size or at what point the knives are in contact therewith. The plan view, Fig. 1, illustrates this feature by showing the knives in several circular rows, the larger of which surrounds the smaller.

The scraping-knives c on the inner ends of the scrapers preferably work loose on the bolts which secure them to the scraper-arms, so as to more exactly accommodate themselves to the inequalities of the carcass. A part or all of the scrapers are also provided with a second set of knives, c', set at right angles with the first, which will scrape under the hams and other places where the angle of the first set is such in relation to the portion to be scraped that they will not take effect. These scrapers are illustrated most clearly in Fig. 10, where knives of both forms are shown attached to the arm. Each form can be attached separately, however, if desired.

For a clear understanding of the spring attachment in the form we now employ, reference is had to Fig. 10. The outer end of the scraper-arm and the bracket are connected by a rod, d, which passes through the spring. Adjustable nuts d' d² are placed upon this rod—one at the opposite end of the spring from the bracket and one at the opposite side of the bracket from the spring. By means of these nuts the scrapers are adjusted with reference to the point they shall reach inside the cylinder, and the tension of the spring is regulated so as to press the scrapers inwardly with a greater or less degree of force.

The sectional view, Fig. 6, only shows two scrapers in the cylinder; but it will of course be understood that so small a number would not be used in practice, and that the others are omitted in this view for the sake of clearness.

It is of importance that the carrier device should be in the form of an endless ladder, rather than in that of a single chain or rope, as the latter, when used, passes through the center of the machine, and thus must always to the extent of its size prevent the scraping-edges from coming in contact with the carcass, while the chains or sides of the former, as shown, travel outside the scraper knives, thus avoiding the disadvantage mentioned, while the cross-bars or ladder-rungs which do pass through the scrapers are transversely across the cylinder or frame-work and in advance of or behind the carcass, where they cannot interfere with the action of the scraping-knives upon it.

As before stated, the arrangement of the sprocket-wheels upon the stud-shafts upon the sides of the machine leaves a clear space through which the carcass may travel as it passes from the scraping-cylinder to the chute, or from one scraping-cylinder to the other, according to whether the machine is used single or double.

The carrier-chains are steadied in their course through the cylinder by guides F' placed therein. This is of importance in that the bars might otherwise catch under the scrapers, as the chains would be likely to sometimes vibrate were no precaution of this kind taken. Similar guides, F², are provided where the chain descends to insure that the trip-rod shall always operate correctly.

The hook O is preferably constructed of two parts, o' o², as shown, in order to give it flexibility. The upper part of the hook has a projection, o, with which the trip-rod engages, and the lower part is preferably provided with a barb, o³, to prevent it from falling out when inserted in the carcass.

It is desirable that an automatic tripping device for detaching the carcasses after being scraped be attached to the machine. A pronged trip-rod, P, in combination with the peculiarly-formed hook O and means for operating said trip-rod, secures this result. The bars $f$ of the endless ladder strike the lever Q' as they pass, forcing it down, and thus through the connecting-rod Q, arm P², and shaft P' bringing down the trip-rod P. This is so arranged as to reach the bar $f$ just in time to catch under the projection $o$ on the hook O, and thus throw the latter and the carcass attached thereto from said bar and allow them to fall upon the chute R, down which they slide to a bench, where the hook is removed and the carcass subjected to further operations.

The hair-catcher is for the purpose of catching and carrying away the hair, dirt, foam, &c., which come from the cylinder as the carcass passes through. It is composed of several sections hinged by hinges $s'$ to a base, (and arranged preferably in pyramidal or conical form,) which recede from each other as the carcass comes in contact with them, but only so far as said carcass forces them. In order that the sections may remain as close to each other as possible, we usually hinge each section in one or more places, and thus only such portions are moved as is necessary to allow the carcass to pass through. The hair, dirt, and foam are washed out upon the perforated platform T, which forms the cover of a receiving-tank, T', into which the water flows through the perforations in said platform, leaving the hair and dirt where they can readily be removed. This also serves as a foam-condenser, and the water, restored to practically its former condition, flows into the scalding-tub Z through the pipe T².

It is of great importance that a large supply of hot water should continually pass through the cylinder while this machine is in operation. We have therefore arranged a series of pipes about said cylinder in position to supply this want, of which W is the main supply-pipe, X transverse pipes running across the cylinder, and Y vertical pipes running down alongside the cylinder. From these latter a large number of small pipes, V V, pass through the sides of the cylinder, through which a large quantity of water is continually thrown upon the scrapers and upon the carcass as it passes through the cylinder. Similar pipes, X', may also lead inwardly from the pipes X for a like purpose. The effect of this water is not only to keep the carcass in proper order to be effectually scraped, but also to keep the scrapers free from hair, which would otherwise clog them and greatly impair the effectiveness of the machine, and it also thoroughly cleans the carcass. As more or less hair is liable to get into the water which passes through these pipes, we therefore, in order to keep the small pipes from getting clogged, place plungers $v\ v$ therein, as shown in Fig. 9, which, upon being thrust forward, force any foreign substance that may be in said pipes through to the inside of the cylinder. The plunger, being withdrawn, leaves the pipe open and free to serve its purpose. In Fig. 9 one of these plungers is shown in its ordinary position and another thrust forward.

In order to save the bristles for the purposes of brush-making, &c., that are suitable for such purposes, we have constructed a separate bristle-catcher, U, and attached it to our machine. It consists of a receptacle, $u$, preferably having a perforated bottom, and a conduit, $u'$, hinged in such position as to discharge into said receptacle. The conduit $u'$ extends upwardly and inwardly inside the cylinder until it reaches a point where the carcass must come in contact therewith as it passes through said cylinder and just below the scrapers. As the carcasses are all attached to the traveling carrier of the machine in the same way, they all pass through the cylinder in the same position. Consequently it is an easy matter to so locate the bristle-catcher that it will catch bristles for the most part, and but little of the hair, which is worthless for the purposes stated.

For convenience in getting inside the cylinder for the purpose of repairs, or to sharpen the scraping-knives, we prefer to construct it in two halves, one of which should be so mounted as to be easily moved back from the other. Tracks A' are therefore firmly attached to the frame A, and the inner half of the cylinder B is mounted thereon, as shown. Smooth ways or trucks $b$ are provided, so that the half-cylinder shall move easily. The halves of the cylinder are readily fastened when brought together by the bolts $b'\ b'$ in the ends of the hoops or castings B' B', which surround them.

In order that the parts of the cylinder shall each be rigid and of substantial construction independent of the other, we prefer to attach the staves thereof to solid castings B', rather than to surround them with common hoops. These castings in the form shown also serve to hold the trucks $b$ or ways, which serve the same purpose, and either of which can be attached thereto.

When the machine is in use, the carrier-chains are expanded considerably in length by the action of the hot water. A tightening device is therefore provided in the form of a shaft, N', bearing wheels G G, over which the chains run, said shaft being mounted in vertically-adjustable boxes $n$ in the saddles N.

We do not claim, broadly, the combination, in a hog-scraping machine, of scraping devices, an endless chain or carrier for drawing the carcass through, over, or in contact with said scraping devices, a scalding-tub arranged in proximity to an ascending portion of said carrier or chain, and means for attaching the carcass while in the tub to said portion of said chain or carrier; nor do we claim, broadly, in a hog-scraping machine, the combination, with an endless chain or carrier, of carcass-hooks provided with downwardly-projecting prongs or arms for engaging with the links of said chain or carrier; but

What we claim as new, and desire to secure by Letters Patent, is—

1. In a hog-scraping machine, a cylinder or equivalent frame-work, through the sides of which run converging arms bearing scraping-knives upon their inner ends, and upon the outer ends of which are spring or weight attachments which force said scrapers inwardly toward the center, all substantially as and for the purpose set forth.

2. A hog-scraping machine in which the cylinder or frame-work bearing the scrapers is divided longitudinally, and of which one part or section is adapted to be moved bodily away from the remaining portion on ways or tracks, substantially as and for the purposes set forth.

3. The combination, with the scrapers C and brackets E, both supported by a suitably-constructed frame-work, of the spring attachment D, substantially as and for the purposes set forth.

4. The combination, with the vibrating scrapers of a hog-scraping machine, of an adjustable spring attachment consisting of a spring, a rod passing through the spring, and adjusting-nuts upon the ends of the rods, said spring attachment being secured to the cylinder or frame-work by a bracket or similar connection, substantially as and for the purposes set forth.

5. The combination, with the scrapers of a hog-scraping machine, of an endless traveling ladder, the chains of which pass outside the scraping-knives, and the cross-bars of which pass through or between the scrapers, substantially as and for the purposes set forth.

6. In a hog-scraping machine, in combination with the cylinder thereof, an endless traveling ladder supported by sprocket-wheels mounted on stud-shafts, whereby a clear passage is provided for the carcass as it passes through the machine, all substantially as set forth.

7. The combination, with a hog-scraping machine, of a series of water-pipes arranged to shower water upon the scrapers and upon the carcass while it is passing through the machine, substantially as and for the purposes herein set forth.

8. In a hog-scraping machine, the combination, with the traveling carrier, of a trip-rod automatically operated by said carrier to release the carcass therefrom at the proper point, all substantially as set forth.

9. The combination of the traveling carrier F f, trip-rod P, shaft P', arm P², connecting-rod Q, and lever Q', arranged as shown and forming an automatic tripping device, substantially as and for the purposes set forth.

10. In a hog-scraping machine, a bristle-catching device composed of a hinged conduit and an appropriate receptacle, substantially as herein set forth.

11. The combination, with the cylinder B and the scrapers C, of the bristle-catcher U, composed of the hinged conduit $u'$ and the receptacle $u$, all substantially as shown and specified.

12. In combination with the traveling carrier and the showering device, the adjustable shaft N', substantially as and for the purposes set forth.

13. The combination, in a hog-scraping machine, of a cylinder or frame-work provided with scrapers, a showering device, and a tank having a perforated top, substantially as shown and described.

14. The combination, with the scraping-cylinder of a hog-scraping machine, of a series of main water-pipes, Y Y, each having numerous smaller pipes leading therefrom toward the center of said cylinder, substantially as and for the purposes set forth.

15. The combination of the frame-work or cylinder, the scrapers, the main water-pipes having smaller pipes leading therefrom toward the center of the cylinder, and plungers for preventing or removing obstructions in said smaller pipes, substantially as and for the purposes set forth.

16. The combination of the frame-work or cylinder provided with scrapers, the guides F', and the traveling carrier, substantially as and for the purposes set forth.

17. In a hog-scraping machine, scrapers C, provided with the scraping-knives $c\ c'$, set at angles with each other, substantially as and for the purposes set forth.

18. In a hog-scraping machine, scrapers C, having the scraping-knives $c$ loosely pivoted thereto, as shown, all substantially as and for the purposes set forth.

19. The combination, with the cylinder of a hog-scraping machine, of a hair-catcher, S, composed of sections $s\ s$, hinged to a base by hinges $s'\ s'$, and each inclining toward a common center, substantially as and for the purposes set forth.

20. The combination, with a hollow cylinder and a means for drawing a carcass centrally through it, of a series of scraping-levers, having one of their arms projecting into the cylinder and the other connected to springs exterior of the cylinder, and a stop for regulating the position of the scraping-levers, substantially as and for the purposes set forth.

In witness whereof we have hereunto set our hands and seals, at Indianapolis, Indiana, this 27th day of March, A. D. 1880.

JAMES CUNNING. [L. S.]
GEO. A. LOWRY. [L. S.]

In presence of—
C. BRADFORD,
M. CRAWFORD.